Dec. 31, 1929.  F. H. BRONNER  1,741,608
CERTIFICATE HOLDER
Filed May 7, 1928  2 Sheets-Sheet 1
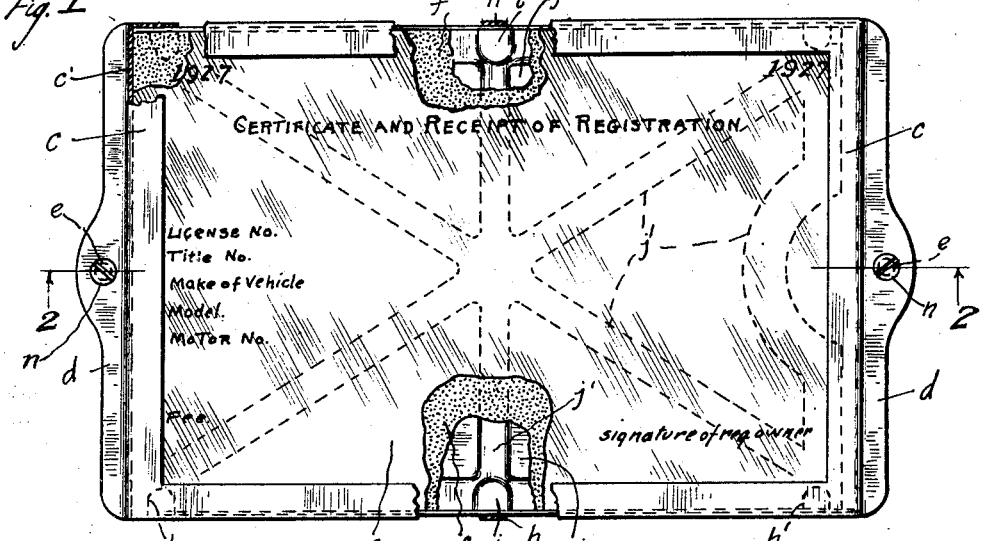
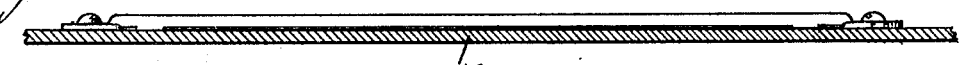
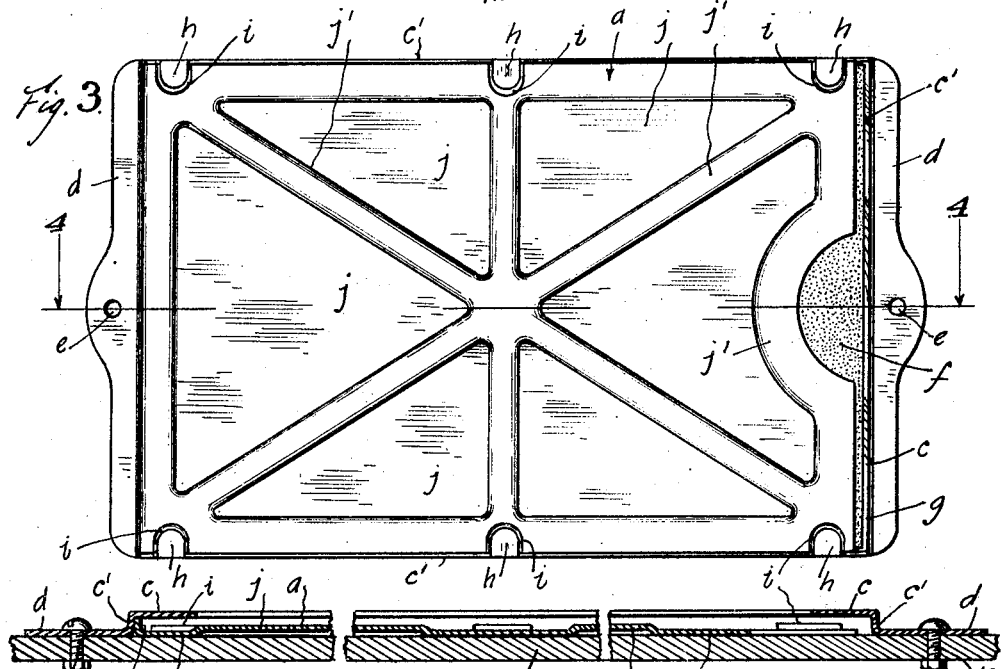
Inventor:
Frederick H. Bronner
by T. J. Geisler
Atty.

Dec. 31, 1929.  F. H. BRONNER  1,741,608
CERTIFICATE HOLDER
Filed May 7, 1928  2 Sheets-Sheet 2
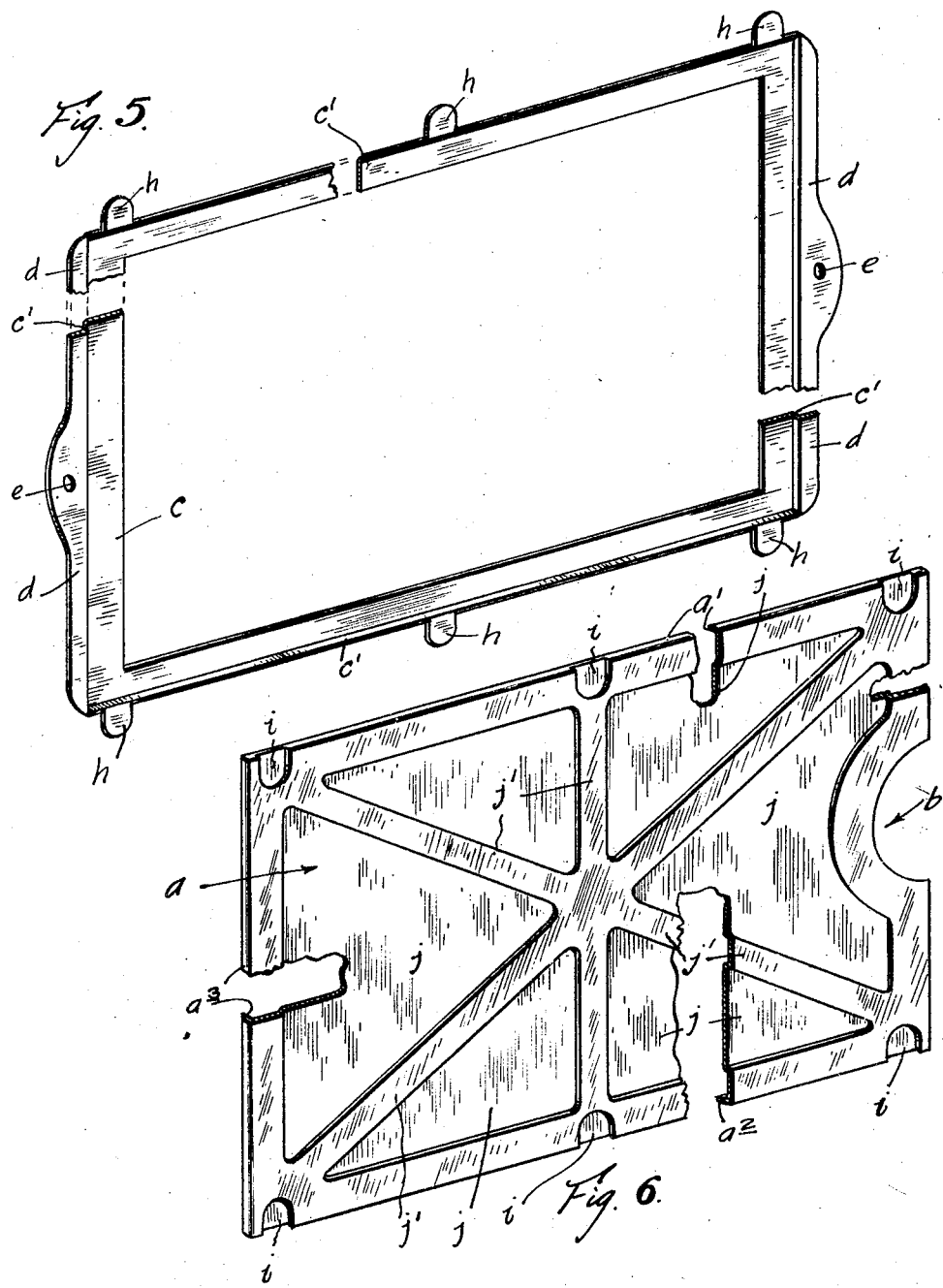

Patented Dec. 31, 1929

1,741,608

UNITED STATES PATENT OFFICE

FREDERICK H. BRONNER, OF PORTLAND, OREGON

CERTIFICATE HOLDER

Application filed May 7, 1928. Serial No. 275,764.

The object of my invention is to provide a simple, inexpensive, holder for a certificate, card or tag, and especially serviceable for holding an auto license on the instrument board of the car. Furthermore, to provide a holder which can be stamped out of sheet metal and which consists of but two parts or pieces so arranged that when the holder is fastened to its supporting surface, the license certificate is protected against the weather and cannot be removed without first releasing the holder from its support.

A further object of my invention is to provide a certificate holder which shall consist of a base and a cover-plate comprising a frame enclosing a space or opening through which to expose the license certificate; preferably covered by a sheet of celluloid, the cover-plate being provided with edge flanges substantially at right angles to the face of the cover plate, the flanges defining an area within which the base plate is adapted to seat or fit; and the cover-plate being provided with means for securing it on a support; the base-plate being adapted to serve for holding the certificate firmly against the frame of the cover-plate; the flange at one end of the cover serving as a locking abutment for the adjacent end of the certificate inserted in the holder, and thus preventing its removal without first releasing the cover-plate from its support; and the base-plate having a finger hole cut at one end facilitating the unseating such end from the cover-plate, whereby the certificate will be brought clear of said locking-abutment flange of the cover-plate, and may then be removed.

The combination of parts by which the above enumerated features are attained, and the general construction, arrangement, and operation of my holder are hereinafter fully described with reference to the accompanying drawings.

In such drawings:

Fig. 1 shows a top view of my certificate holder secured to a suitable support, with portions broken away to show underlying parts;

Fig. 2 shows a section on the line 2—2 of Fig. 1;

Fig. 3 shows a bottom plan view of my holder;

Fig. 4 shows a section taken on the line 4—4 of Fig. 3, except that the certificate and transparent sheet have been removed;

Fig. 5 shows a perspective elevation of the bottom or underside of the cover-plate of my holder; and Fig. 6 shows a similar view of the base-plate of my holder.

Referring now to the figures my invention comprises a base-plate $a$ provided with upturned flanges $a'$, $a^2$, and $a^3$ on two sides and one end, respectively, the other end having a curved portion cut away as at $b$ to provide a finger hole.

The base-plate $a$ is mounted in a cover-plate or frame $c$ which is provided with substantially right-angled flanges $c'$ on its ends and sides to define a space within which the base-plate $a$ seats. The end flanges are provided with outwardly extending ears $d$ substantially at right angles to the flanges, which ears are provided with holes $e$, and serve as means for securing the frame to a flat surface, in such a manner that a certificate $f$ being inserted between the base-plate and the frame, and the certificate holder fastened to the instrument board, the certificate will not be removable without removing the holder from the instrument board.

A sheet of transparent material $g$ is inserted in said frame to protect the face of the certificate. Flexible lugs $h$ are formed at and extending beyond the free edges of the side flanges $c'$, the lugs being arranged adjacent the respective ends of the flanges, and being adapted to be bent inwardly and clamp the said base-plate in the frame, raised portions $i$ are provided in the said base-plate forming depressions on the exterior surface of the base-plate adapted to receive the lugs.

The base-plate is also provided with raised supporting sections $j$, to hold the certificate closely in the cover-plate, forming between them radially arranged lower plane sections $j'$ serving as stiffening ribs.

By this construction and arrangement, I have provided a certificate holder, constructed of two pieces, the base-plate $a$ and the frame $c$ in which a sheet of transparent material $g$ and the certificate may be inserted.

In inserting the certificate, the finger hole $b$ at one end of the base-plate provides for convenient insertion and the flanges $a^3$ and $c'$ at the end of the holder prevent the certificate from sliding out the other end.

When the holder is provided with a certificate and the protecting transparent material and fastened to an instrument board $m$ as at $n$, the certificate can not be removed without removing the holder from its support and the raised portions $j$ of the base-plate serve to hold the certificate closely against the frame $c$.

I claim:

A holder for sheet material, including a base plate having upstanding flanges to define a space within which the sheet material may be placed, a cover plate of skeleton form having right angularly related flanges at its edges to provide a space within which the base plate and sheet material may be received, the flanges at the ends of the cover plate having outwardly projecting right angled ears extending from their free edges to provide means whereby the cover plate may be secured to a fixture, the securing of the cover plate to the fixture serving to prevent displacement of the base plate from the space defined by the flanges of the cover plate, and flexible lugs carried by the flanges of the cover plate to overlie and bear upon the base plate to hold the latter within the space defined by the flanges of the cover plate.

FREDERICK H. BRONNER.